(12) United States Patent
Baranov et al.

(10) Patent No.: US 6,285,495 B1
(45) Date of Patent: Sep. 4, 2001

(54) OPTICAL TRANSMISSION ELEMENT FOR CAPTURING AND REDIRECTING INCIDENT RADIATION

(75) Inventors: Vladimir Kuzmich Baranov, St. Petersburg (RU); Michael Muski, Alexander Heights (AU)

(73) Assignee: Tropiglas Pty Ltd. (AU)

( * ) Notice: Subject to any disclaimer, the term of this patent is extended or adjusted under 35 U.S.C. 154(b) by 0 days.

(21) Appl. No.: 09/194,466
(22) PCT Filed: May 19, 1997
(86) PCT No.: PCT/AU97/00305
    § 371 Date: Jan. 21, 1999
    § 102(e) Date: Jan. 21, 1999
(87) PCT Pub. No.: WO97/44690
    PCT Pub. Date: Nov. 27, 1997

(30) Foreign Application Priority Data

May 22, 1996 (AU) .................................................... PO0013
Nov. 4, 1996 (AU) .................................................... PO3423

(51) Int. Cl.$^7$ .................................................... G02B 5/22
(52) U.S. Cl. .................... 359/350; 359/361; 250/227.31; 250/488.1
(58) Field of Search .................................... 359/350, 359, 359/361, 609, 614; 250/487.1, 488.1, 227.31

(56) References Cited

U.S. PATENT DOCUMENTS

| 5,078,462 | * | 1/1992 | Gravisse | 359/359 |
| 5,820,265 | * | 10/1998 | Kleinerman | 374/137 |
| 6,067,188 | * | 5/2000 | Zieba et al. | 359/350 |

* cited by examiner

Primary Examiner—Cassandra Spyrou
Assistant Examiner—Mark A. Robinson
(74) Attorney, Agent, or Firm—Cook, Alex, McFarron, Manzo, Cummings & Mehler, Ltd.

(57) ABSTRACT

An optical element comprising a plurality of transparent layers comprising one or more passive layers (11) and one or more active layers (12) wherein said passive layers (11) facilitate the transmission of electromagnetic radiation in a substantially unaltered form and the at least one active layers (12) include an active material dispersed through the active layer and having the capacity to intercept electromagnetic radiation of at least one predetermined wavelength or range of wavelengths and redirect at least a portion of energy of the intercepted radiation into the interior of the optical element, said layers being in face to face relationship and being optically coupled to each other.

20 Claims, 3 Drawing Sheets

OPTICAL TRANSMISSION ELEMENT FOR CAPTURING AND REDIRECTING INCIDENT RADIATION

BACKGROUND OF INVENTION

The present invention relates to an optical element and in particular is intended to relate to an optical element which is capable of transmitting electromagnetic radiation and in so doing capturing from the incident radiation a range or number or ranges of wavelengths and redirecting at least some of the eliminated radiation from the optical element in a controlled manner.

Throughout the specification the term "optical element" is not to be limited to one for use with the visible spectrum but is applicable to all forms of electromagnetic radiation including, but not limited to, microwave, infrared, visible, ultraviolet, X and gamma radiation.

In the past it has been known to provide luminescent materials which are capable of absorbing selected wavelengths or ranges of wavelengths of electromagnetic radiation such as visible light, infra-red radiation, ultraviolet radiation, X-radiation and the like and remitting at a different wavelength or range of wavelengths. Such materials can comprise organic dyes or similar organic compounds as well as inorganic compounds such as salts of rare earth elements.

It is an object of the invention to provide an optical element which has the capacity to intercept some of the electromagnetic radiation incident on the optical element and to redirect such radiation into the interior of the optical element to be able to be emitted from the optical element separately from the remaining transmitted radiation.

Accordingly the invention resides in an optical element comprising a plurality of transparent layers comprising one or more passive layers and one or more active layers wherein said passive layers facilitate the transmission of electromagnetic radiation in a substantially unaltered form and the at least one active layers include an active material dispersed through the active layer and having the capacity to intercept electromagnetic radiation of at least one first predetermined wavelength or range of wavelengths and redirect at least a portion of energy of the intercepted radiation into the interior of the optical element said layers being in face to face relationship and being optically coupled to each other.

According to a preferred feature the active material may comprise substances or particles which are reflective and/or dispersive in relation to at least a portion of the intercepted radiation.

It is a preferred object of the invention to provide a transparent optical element which can utilise the properties of luminescent materials to eliminate from the incident radiation, the selected wavelengths or ranges of wavelengths.

SUMMARY OF THE INVENTION

Accordingly the invention also resides in an optical element comprising a plurality of transparent layers comprising one or more passive layers and one or more active layers wherein said passive layers facilitate the transmission of electromagnetic radiation in a substantially unaltered form and the at least one active layers include a luminescent material having the capacity to absorb electromagnetic radiation of a first predetermined wavelength or range of wavelengths and consequently emit electromagnetic radiation of a second predetermined wavelength or range of wavelengths, said layers being in face to face relationship and being optically coupled to each other.

DETAILED DESCRIPTION OF THE INVENTION

According to one particular embodiment the optical element comprises three layers comprising a central active layer between two passive layers.

According to an alternative embodiment of the invention the optical element comprises one active layer and one passive layer.

According to a further embodiment of the invention a plurality of active layers are provided between a pair of outermost passive layers. According to one form of the embodiment the active layers are in face to face relationship with each other.

According to an alternative form of the embodiment the active layers are separated from each other by a passive layer. Each of the active layers may accommodate differing luminescent materials having different absorption emission characteristics and if desired the absorption characteristics of the active layers may be complementary whereby the luminescent material of the first layer encountered by the incident radiation emits a radiation which will be absorbed by the luminescent material of the second active layer encountered by the incident radiation, said layers being in face to face relationship and being optically coupled to each other.

According to a preferred feature of the invention the optical element may comprise a curved panel wherein the convex face is directed towards the source of said incident radiation, or away from it.

According to a further preferred feature of the invention a portion of the edges of the optical element are adapted to be reflective to the emitted radiation.

According to a further preferred feature of the invention at least a portion of the edge of the optical element are configured to facilitate emission of the emitted radiation from the optical element. In one form at least some of the edges may be chamfered.

According to a further preferred feature of the invention at least one face of the optical element is formed with a discontinuity to facilitate the emission of emitted radiation from the optical element. The form of discontinuity may comprise at least one groove formed in the at least one face. Another form of discontinuity may comprise one or more depressions or dimples provided in the at least one face. Another form of discontinuity may comprise at least one rib or protrusion on the at least one face. Another form of discontinuity may comprise an etched surface on a portion of the at least one face.

BRIEF DESCRIPTION OF THE FIGURES

The invention will be more fully understood in the light of the following description of several specific embodiments. The description is made with reference to the accompanying drawings of which.

DETAILED DESCRIPTION OF THE PREFERRED EMBODIMENTS

Figure 1:
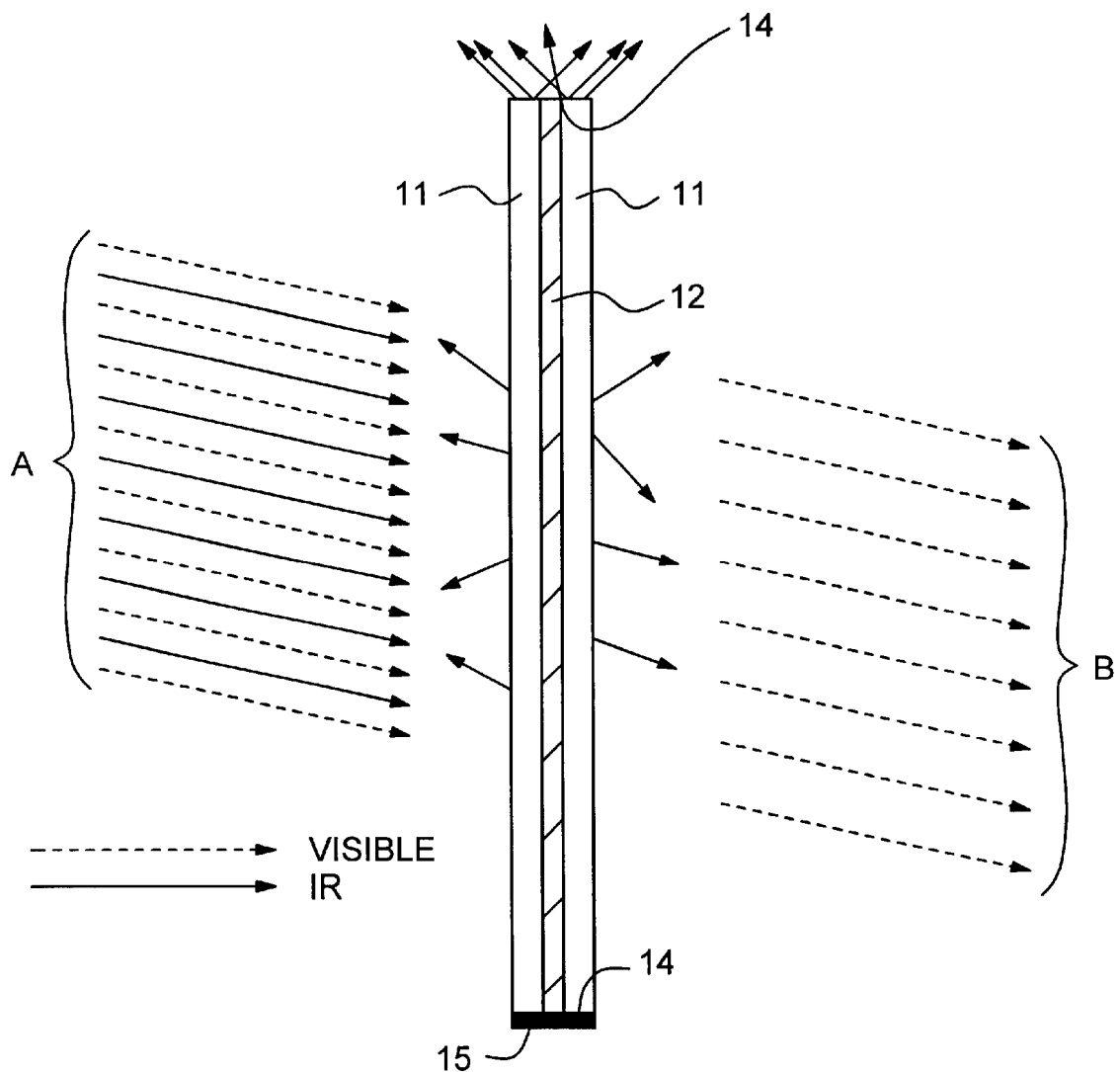
FIG. 1 is a schematic sectional representation of the panel according to the first embodiment which illustrates a particular example of the invention and which comprises an optical element in which the infrared portion of the spectrum of the incident radiation is able to be absorbed and the energy redirected.

It is an object of each of the four embodiments of the invention shown in the drawings to provide a panel which has a high degree of transparency in the visible range of the electromagnetic spectrum (ie from 400–650 nm) but is capable of at least partially eliminating form the transmitted radiation particular wavelengths such as the infrared radiation, ultraviolet radiations (ie UV-A, UV-B and UV-C). In addition if desired the panel may be such that the light transmitted through the panel and redirected to the edges is of a predetermined colour. It is also an object of the embodiments however that most of the energy which is absorbed by the panel is dissipated as a result of re-emission of the absorbed radiation and redirection of such emitted radiation to a predetermined portion of the panel.

Figure 2:
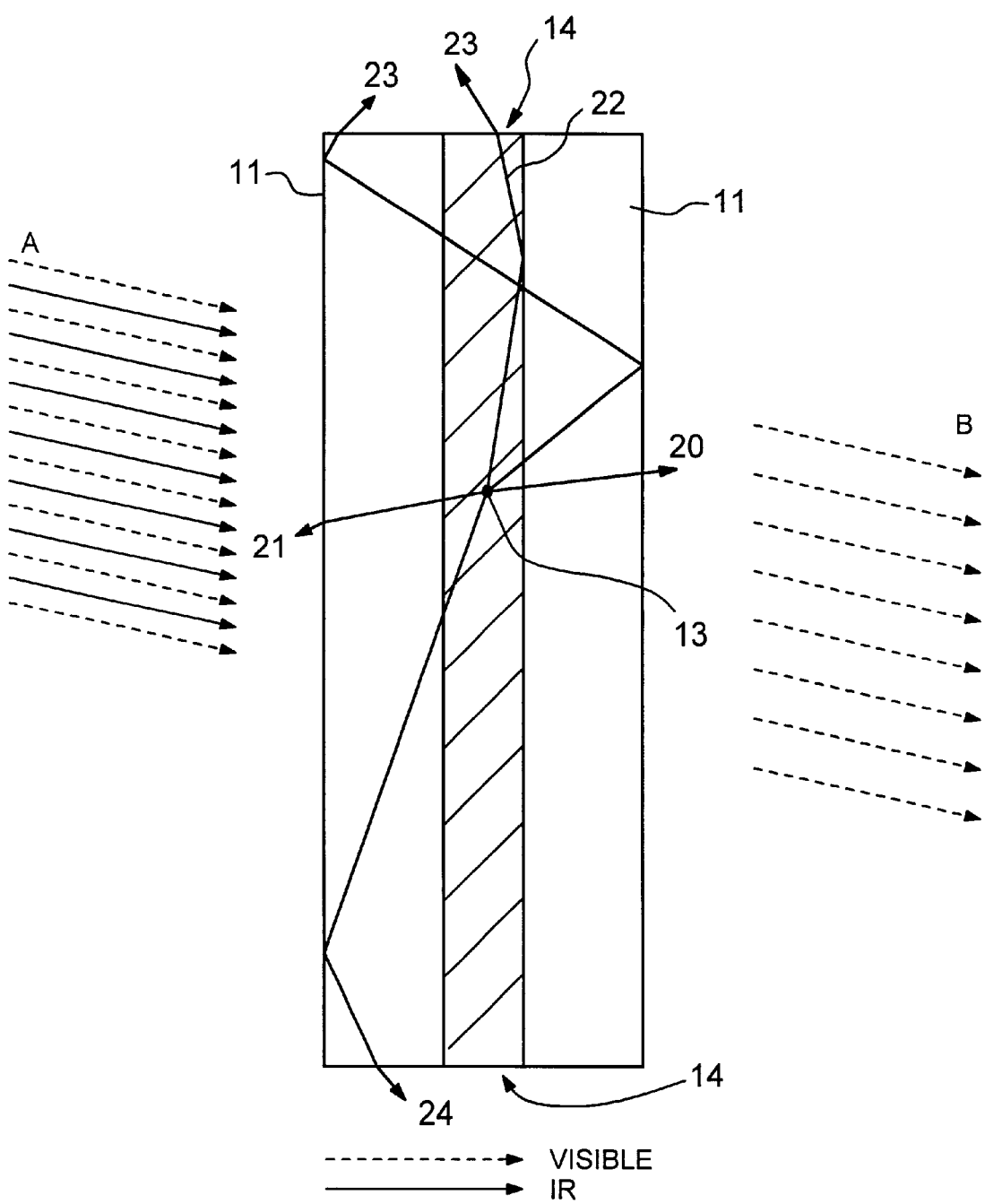
FIG. 2 is an enlarged schematic part sectional view of the panel of the first embodiment shown at FIG. 1.

As shown at FIGS. 1 and 2 the first embodiment comprises a multi-layered transparent panel which comprises a pair of outermost passive layers 11 which are separated by a central active layer 12. The layers 11 and 12 are in face to face engagement with each other and are optically coupled such that the passage of radiation from one layer to the other is only effected by the differences in the refractive indices of the adjacent layers.

The central active layer incorporates a luminescent materials which is capable of absorbing electromagnetic radiation of the one or more particular wavelengths or ranges of wavelengths which are to be eliminated from the incident radiation. In the case of the first embodiment shown at FIGS. 1 and 2 the active layer is capable of absorbing infrared radiation. The active layer is formed of an organic polymeric or like material. Such a material is preferred since it is capable of accommodating a large range of organic luminescent materials with the required spectral characteristics.

However if desired the active layer may be formed of an inorganic material such as glass which accommodates a luminescent material which is appropriate for use with glass.

The passive layers 11 are such that they transmit the incident radiation in a substantially unattenuated or modified form and are formed of glass or other suitable transparent material including polymeric material. The passive layer serves as a flat electromagnetic radiation conduit and additionally provides a protective surface for the active layer. In the case of the first embodiment the passive layers also provides a medium of a higher refractive index.

The thickness of the layers can be varied according to the nature of the application of the panel and if desired the active layer may be formed as a membrane or film.

The first embodiment shown in FIGS. 1 and 2 comprises a transparent panel which is capable of absorbing infrared radiation but will permit the transmission of the visible spectrum of electromagnetic radiation. As shown at FIG. 2 the incident radiation A comprises electromagnetic radiation comprising both the visible spectrum and also infrared radiation whilst the transmitted radiation B comprises electromagnetic radiation of mostly the visible spectrum. On the passage of the radiation through the panel the luminescent material will absorb the infrared radiation from the radiation incident on the molecules of the luminescent material and as a result of such absorption the luminescent material will be caused to emit electromagnetic radiation of another wavelength. Such radiation will be emitted in all directions from the molecule however of that emitted radiation, only a portion (represented by ray 20) will pass from the rear face of the panel while a corresponding portion (represented by a ray 21) will pass from the front face of the panel. A further portion of the emitted radiation (represented by the ray 22) will be fully or partially trapped within the active layer 12 as a result of full internal reflection at the interface between the active and passive layers 12 and 11 respectively while the remaining portion of the emitted radiation represented by the rays 23 and 24 will be trapped in the panel as a whole or in each passive layer 11 as a result of total internal reflection at the outer faces of the passive layers 11.

In the case of the first embodiment normal window glass, having a refractive index approximating 1.5, is used as the passive panels, approximately 75% of the radiation emitted from the luminescent material will exit the panel through the edges and the remainder will exit through both the front and rear faces of the panel (ie 12.5% of the emitted radiation exits from the front face of the panel towards the source of radiation and 12.5% of the emitted radiation passes from the rear face of the panel together with the transmitted radiation).

The degree of entrapment of the emitted radiation within the active layer 12 can be governed by providing materials utilised in the formation of the active and passive layers which are of suitably different refractive indices while the degree of entrapment of the emitted radiation within the panel as a whole or alternatively within the passive layers can be determined by choosing a glass or other suitable transparent material of an appropriate refractive index.

As a result, most of the emitted radiation created by the luminescent material within the active layer 12 will be transmitted from the edges 14 of the panel. In the embodiment as shown at FIG. 1 a portion of the edge of the panel is provided with a reflective material 15 and/or is modified to be able to be reflective to the emitted radiation contained within the panel which will ensure that the entrapped emitted radiation will be emitted from a predetermined portion of the edge of the panel.

Figure 3:
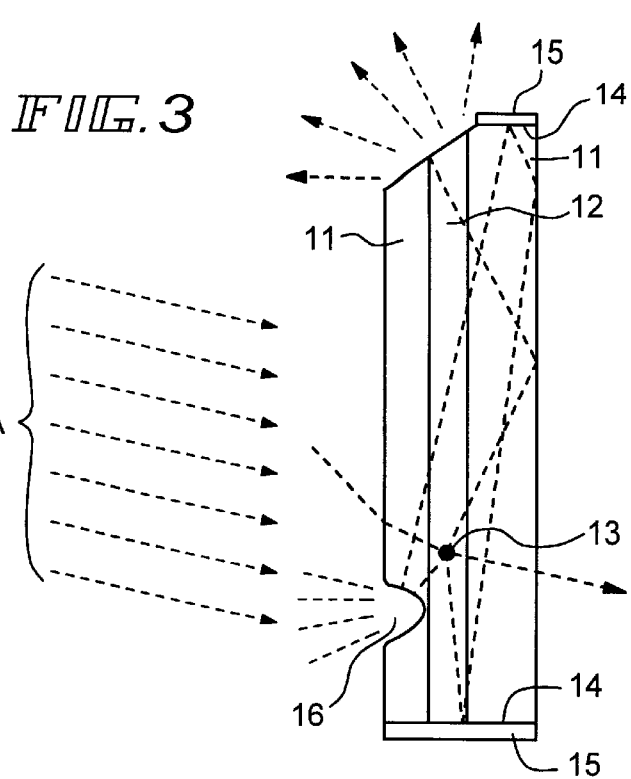
FIG. 3 illustrates modifications that can be made to the panel of the first embodiment to effect the emission of the emitted radiation from particular zones of the panel.

FIG. 3 illustrates modifications which can be provided at the edges of the panel and on the surface of the front or rear face of the panel to provide zones from which the entrapped radiation can be selectively emitted. As shown such modifications can comprise providing a chamfer along at least one edge and modifying the remaining edges of the panel to be reflective by providing a reflective coating 15 or suitable adaptation at the remaining edges to render them reflective. Another form of modification comprises formation of a discontinuity 16 at one of the faces of the panel which provides a zone from which the emitted radiation can be emitted form the panel. Such a discontinuity can comprise a groove, recess, dimple, rib or protrusion. Another form of discontinuity can include etching of the surface.

One application of the first embodiment comprises utilisation of the panel and glazing whereby the glazing serves a similar function as window tinting which has been applied in the past. It is characteristic of the embodiment however, that the radiation which is absorbed by the panel is dissipated in a controlled manner from the panel. Such dissipation ensures that there is a reduced heating of the window panel which would be a result of the absorption of the infrared radiation and such dissipation enables the utilisation of the re-emitted radiation in whatever manner maybe desired. Such re-utilisation may comprise use of photoelectric cells for the conversion of the re-emitted radiation into electrical energy, decorative purposes by providing visual highlights which may be visible form the exterior of the panel, or heating, or whatever other purpose may be desired. In such an instance one of the layers may, if desired, may be tinted in order that the transmitted radiation is of a predetermined colour and/or the luminescent material may be such that a re-emitted radiation is of a particular wavelength of the visual spectrum in order to colour the transmitted radiation B.

In order to reduce the proportion of emitted radiation passing from the rear face of the panel it is possible to provide a panel of curved configuration whereby a greater proportion of the emitted radiation passing from the front and rear face of the panel will be emitted form the convex face of the panel.

Whilst the first embodiment comprises a panel which is capable of absorbing incident infrared radiation, it is possible to provide an active layer which is able to absorb some or all UV radiation in addition to, or instead of the infrared radiation. In addition it is envisaged that the invention would have application to utilisation of any form of electromagnetic radiation whereby the active layer is able to absorb from the incident electromagnetic radiation the particular form of radiation which is to be excluded from the transmitted radiation.

Figure 4:
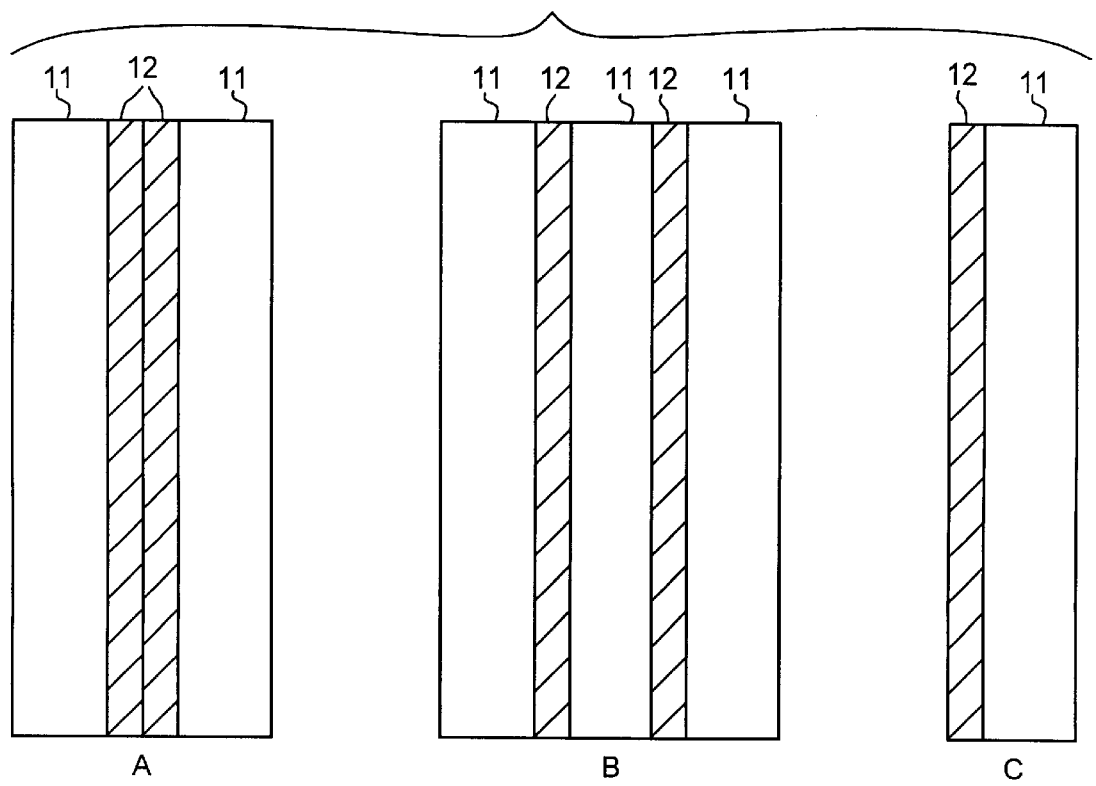
FIG. 4A, 4B, and 4C illustrate the additional embodiments of the invention.

FIG. 4 illustrates three alternative embodiments of the invention.

The second embodiment shown at FIG. 4A comprises a panel incorporating two active layers 12 sandwiched between a pair of passive layers 11 where the active layers are in face to face relationship to each other.

The third embodiment as shown at FIG. 4B comprises a multi-layered panel incorporation two active layers 12, separated by an intermediate passive layer 11 with a passive layer to each side of the two active layers 12.

In the case of the second and third embodiments the absorption characteristics of each of the-active layers 12 may be complementary to each other whereby the luminescent emission band of the active layer first intercepted by the incident radiation spectrally coincides with the absorption band of the second active layer.

The fourth embodiment as shown at FIG. 4C comprises a two layered panel incorporating a single passive layer 11 and a single active layer 12.

According to a fifth embodiment of the invention, the luminescent material of each of the above embodiments may be supplemented or replaced by a dispersive or reflective material such as a dye which is interspersed through the active layer and which is able to reflect or disperse a particular wavelength or range of wavelengths. The reflected or dispersed radiation will become "entrapped" within the panel as a result of total internal reflection in the same manner as the emitted radiation of the previous embodiments and can be caused to be emitted from the panel as described in the previous embodiments. According to an alternative form of this embodiment the dye can be replaced or supplemented by the use of particulate reflective material such as fine metal powders or the like which are interspersed through the active layer.

One essential difference between optical element of each of the embodiment as and the prior art systems relates to the circumstance that the optical element of the embodiment provides a light conduit and an optical filter in the one element. The presence of a set of layers optically coupled together where at least one layer contains one or more luminescent materials serves to increase the light conductivity of the whole optical element while the active layer, which contains luminescent materials is used as an optical (electromagnetic radiation) filter. In the prior art, similar single layer elements were used only for concentration of electromagnetic radiation, but not for filtration of this radiation. The combination of a light conduit and radiation filter results in an optical element, which can filter out undesired, or dangerous radiation, and transforms it spectrally and re-radiates it in a required direction.

It should be appreciated that the scope of the present invention need not be limited to the particular scope of the embodiments described above.

The claims defining the invention are as follows:

1. An optical element including outer layers enclosing at least one optically active inner layer selected to absorb incident near infrared radiation passing through the interface with one or more of said outer layers and fluoresce at one or more characteristic near infrared wavelengths without substantial heating, the respective layers being substantially transparent to both said one or more characteristic near infrared wavelengths and the visible spectrum, the outer and inner layers having relative refractive indices selected whereby said inner layer provides a light guide directing a portion of said fluorescence to an edge thereof.

2. An optical element according to claim 1, wherein the inner layer includes a substance or particles which are reflective or dispersive in relation to at least a portion of the intercepted radiation.

3. An optical element according to claim 1, wherein said outer layers are glass.

4. An optical element according to claim 1, wherein said inner layer comprise an organic polymer matrix and wherein said fluorescence is due to a fluorescent dye dissolved therein.

5. An optical element as claimed at any one of the preceding claims and including one said inner layer.

6. An optical element as claimed in any one of claims 1 to 4 and including at least two inner layers.

7. An optical element as claimed at claim 6, wherein the inner layers are separated from each other by a passive layer.

8. An optical element as claimed at claim 6, wherein the fluorescence of said inner layers is due to two or more fluorescent materials therein having different absorption emission characteristics.

9. An optical element as claimed in claim 8, wherein the fluorescence of each of the inner layers is due to respective said different fluorescent materials.

10. An optical element as claimed at claim 9 wherein the absorption characteristics of the inner layers are complementary whereby the fluorescent material of a first inner layer encountered by the incident radiation emits a radiation which will be absorbed by the fluorescent material of a second inner layer.

11. An optical element as claimed in claim 1, comprising a curved panel adapted to be disposed with its convex face directed towards the source of said incident radiation.

12. An optical element as claimed in claim 1, comprising a curved panel adapted to be disposed with its concave face directed towards the source of said incident radiation.

13. An optical element as claimed in claim 1, wherein at least a portion of the edges of the respective layers are configured to facilitate emission of the fluorescence.

14. An optical element according to claim 13, wherein a portion of the edges of respective layers are substantially reflective for the fluorescence.

15. An optical element as claimed at claim 13, wherein at least some of the edges of said layers are chamfered.

16. An optical element as claimed in claim 1, wherein an outer surface of said outer layers is formed with a discontinuity to facilitate the emission of fluorescence passing into the respective outer layer.

17. An optical element as claimed at claim 16, wherein the form of discontinuity comprises at least one groove.

18. An optical element as claimed at claim 16, wherein the form of discontinuity comprises one or more depressions or dimples.

19. An optical element as claimed at claim 16, wherein the at least one discontinuity comprises at least one rib or protrusion.

20. An optical element as claimed at claim 16, wherein the at least one discontinuity comprises an etched surface portion.

* * * * *